United States Patent [19]

Woolf et al.

[11] Patent Number: 5,149,684

[45] Date of Patent: Sep. 22, 1992

[54] PRODUCTION OF A SUPERCONDUCTOR POWDER HAVING A NARROW MELTING TRANSITION WIDTH USING A CONTROLLED OXYGEN ATMOSPHERE

[75] Inventors: Lawrence D. Woolf, Carlsbad; Frederick H. Elsner, Cardiff; Clyde H. Shearer, Santee, all of Calif.

[73] Assignee: General Atomics, San Diego, Calif.

[21] Appl. No.: 682,552

[22] Filed: Apr. 9, 1991

[51] Int. Cl.$^5$ .................. C01D 11/02; C01D 11/00; C01G 3/02

[52] U.S. Cl. .................... 505/1; 252/521; 423/604; 423/635; 505/742; 505/776; 505/779

[58] Field of Search ............... 505/1, 742, 776, 777, 505/778, 779, 780; 252/518, 521; 423/604, 635

[56] References Cited

U.S. PATENT DOCUMENTS

| 4,943,557 | 7/1990 | Ling | 505/1 |
| 4,983,571 | 1/1991 | Rao | 505/1 |
| 5,021,395 | 6/1991 | Druliner | 505/742 |
| 5,049,542 | 9/1991 | Bruss | 505/1 |

OTHER PUBLICATIONS

Qadri "X-ray identification of the superconducting high Tc . . . " *Physical Review* B vol. 35, No. 13 May 1, 1987, pp. 7235–7237.
Uno "Synthesis of Superconducting Oxides' by Vacumm . . . " *Jap. Jnl. Appl. Physics* vol. 27 (6) Jun. 1988, pp. 1003–1006.
Iguchi "Structural & Superconducting Properties of $Yba_2Cu_3O_7$ . . . " *Jap. Jnl. Appl. Phys.* vol. 27(6) Jun. 1988, pp. L992–:995.
Balachandran, U., et al. *Synthesis of Ceramic Superconductors Under Low Oxygen Pressure.* Argonne National Laboratory, Dec. 1989.
Balachandran, U., et al. *Synthesis of Phase-Pure Orthorhombic $YBa_2Cu_3O_x$ Under Low Oxygen Pressure.* Argonne National Laboratory, Aug. 1989.

Primary Examiner—A. Lionel Clingman
Assistant Examiner—John Boyd
Attorney, Agent, or Firm—Nydegger & Associates

[57] ABSTRACT

A process for preparing a superconductor-coated substrate including calcining a mixture of powdered yttrium or rare earth oxide (R), barium carbonate and copper oxide in a controlled atmosphere and in accordance with a predetermined temperature profile to form a superconductor powder having a stoichiometric ratio of R-Ba-Cu of approximately 1-2-3. The melting transition width of the resulting powder is relatively narrow, such that the melting onset temperature is above the high temperatures advantageously used to sinter the powder on the substrate.

11 Claims, 3 Drawing Sheets

PRODUCTION OF A SUPERCONDUCTOR POWDER HAVING A NARROW MELTING TRANSITION WIDTH USING A CONTROLLED OXYGEN ATMOSPHERE

FIELD OF THE INVENTION

The present invention relates generally to processes for manufacturing superconductors. More specifically, the present invention relates to processes for manufacturing superconductor powders. The present invention specifically, though not exclusively, relates to processes for preparing a superconductor powder having a narrow melting transition width.

BACKGROUND OF THE INVENTION

Superconductivity, the property whereby certain materials have the ability to lose electrical resistance at extremely low temperatures, was discovered in 1911. However, significant commercial exploitation of superconductivity has only recently occurred.

With the development of niobium-titanium materials which can be drawn into wires, which have a superconducting transition temperature ($T_c$) above 10K, and which can remain superconducting even in high magnetic fields, superconducting electromagnets have become commercially practical. Despite the great expense inherent in cooling niobium-titanium materials with liquid helium, superconducting electromagnets are now in widespread use in medical devices, scientific research apparatus, and in advanced electronic circuitry.

Many other applications for superconductors have been developed which are not yet commercially feasible because of the cost of cooling superconductor materials presently available in wire and thin film form. Among the prospective $ commercial applications are superconducting electric motors, magnetically levitated trains or other vehicles, long distance low loss transmission of electric power, magnetic energy storage, and much smaller and more powerful computers. Superconductors capable of remaining in their superconductive state above the temperature of liquid nitrogen, 77K, would make many of these applications practical.

In 1986 Mueller and Bednorz discovered a new class of superconducting materials having a much higher $T_c$ than niobium-based materials. Intensive, world-wide research since then has produced related materials having a $T_c$ as high as 125K. Among these materials are superconductors which have a perovskite crystal structure and the basic formula $R_1Ba_2Cu_3O_{7-x}$, where R is yttrium or a rare earth metal and x is between 1.0 and 0. These compounds are colloquially known as "1-2-3" compounds because of the ratio of R to barium to copper.

Early 1-2-3 superconductors were commonly prepared as powders by mixing powdered yttrium or rare earth oxide, barium carbonate and copper oxide in appropriate proportions. The mixture was finely ground followed by calcining in air or oxygen at atmospheric pressure and at a temperature as high as 950° C. for approximately 4 to 24 hours. The calcined material was then typically reground and recalcined at least one additional time.

The product resulting from the above-described process generally contained some undesirable impurity phases in addition to the 1-2-3 phase. When the product was subsequently sintered at temperatures between about 850° C. and 1100° C., the impurity phases tended to react with each other or with the 1-2-3 phase to form liquids. Liquids phase relations of this nature are well known and described in Aselage, et. al., "Liquids Relations in Y-Ba-Cu Oxides:, *J. Mater. Res.* 3, 1279 (1988); and Ullman, et. al., "Effect of Atmosphere and Rare Earth on Liquidus Relations in RE-Ba-Cu Oxides", *J. Mater. Res.*, 4, 752 (1989).

The presence of liquids along with the 1-2-3 phase in the product can have serious deleterious effects, as enumerated below, on the properties and performance of the 1-2-3 superconductor, and particularly on the critical current density ($J_c$) of the 1-2-3 superconductor. Frozen liquids can coat the grain boundaries of the 1-2-3 phase, thereby forming an electrically resistive non-superconducting barrier on the 1-2-3 phase. The liquids can cause significant grain growth of the 1-2-3 phase during sintering. This in turn can result in undesirable microcracking of the grains due to the large anisotropy in the thermal expansion of the 1-2-3 phase. If the 1-2-3 superconductor is to be coated on a substrate, the liquids can react with the substrate, thereby corroding and embrittling the substrate. The liquids can also transport substrate components into the superconductor coating, which can dope the superconductor and significantly reduce the values of $T_c$ and $J_c$.

There presently exists considerable interest in coating metallic substrates, such as Ni or Ni-alloys including Duranickel 301, with 1-2-3 superconductor powder and sintering the powder thereon. Accordingly, it has been found desirable in the manufacture of coated substrates to use superconductor powder that is substantially free of any impurity phases capable of forming detrimental liquid phases at the elevated sintering temperatures. Furthermore, it has been found in the continuous production of superconductor coated metal fiber, such as described in co-pending U.S. Pat. application, Ser. No. 586,450, that it is desirable to sinter the superconductor powder coating the fiber in a relatively short time frame, i.e., approximately 0.1 to 10 minutes.

In order to sinter a relatively pure 1-2-3 powder in a short time, the sintering temperature should be as high as possible without substantially melting any of the powder. Thus, the sintering temperature should be near, yet below, the melting onset temperature of the powder. Given these constraints, it is apparent that the melting transition width of the superconductor powder should desirably be as small as possible so that the sintering temperature can approach the melting transition midpoint without melting the powder.

As such, there is a need for superconductor powders which have a high $T_c$ and which are capable of being sintered at high temperatures without melting. It is therefore an object of the present invention to provide a process for manufacturing a superconductor powder having a high $T_c$. It is another object of the present invention to provide a process for manufacturing a single phase superconductor powder containing substantially no impurity phases which could lead to undesirable liquid phases at elevated sintering temperatures. Another object of the present invention is to provide a process for manufacturing a superconductor powder having a relatively small melting transition width. Further, it is an object of the present invention to provide a process for manufacturing large quantities of a superconductor powder having a fine particle size which is relatively easy and cost-effective to use.

SUMMARY OF THE INVENTION

The present invention is a process for preparing a superconductor powder which includes calcining a mixture of powdered yttrium or rare earth oxide, barium carbonate and copper oxide in a controlled atmosphere and in accordance with a predetermined temperature profile to form a superconductor powder. The stoichiometric ratio of R-Ba-Cu in the powder is approximately 1-2-3.

The process specifically provides for an initial heating stage, wherein the mixture is heated in a controlled atmosphere of flowing oxygen up to a maximum preheat temperature. If desired, the heating rate in this stage can be relatively rapid. Upon reaching the preheat temperature, a second heating stage proceeds at a slow controlled heating rate, while maintaining the mixture in the initial controlled atmosphere. When the second heating stage reaches a plateau temperature, which is selected below the lowest temperature eutectic of the mixture, the mixture is maintained at that plateau temperature in the initial controlled atmosphere for an extended time period.

The product resulting from the second heating stage is adequately calcined to exhibit satisfactory purity, but this stage exhibits too broad of a melting transition width to enable satisfactory sintering thereof. Therefore, a third heating stage is performed to raise the melting onset temperature and consequently narrow the melting transition width of the final product.

The third heating stage comprises increasing the temperature of the product to a second plateau temperature where the product is maintained for an extended time period, while either increasing the oxygen partial pressure or maintaining the same initial oxygen partial pressure. Following the third heating stage, the product is slowly cooled in oxygen to an intermediate cooling temperature. The cooled product can be maintained in oxygen at the intermediate temperature for an extended time period to ensure complete oxygenation. Thereafter, the product is cooled to room temperature in air or oxygen, as desired.

The 1-2-3 powder produced in accordance with the above-recited process is substantially freer of impurity phases than similar 1-2-3 powders produced by known methods. Further, the melting transition width of the present powder is relatively narrow, such that the melting onset temperature is above the high temperatures advantageously used to sinter the powder. The present powder preferably has a melting transition width of less than about 30° C. as determined by differential thermal analysis. These properties enable rapid and effective sintering of the powder onto a substrate at a relatively high temperature without substantial melting of the powder.

The novel features of this invention, as well as the invention itself, will be best understood from the accompanying description, taken in conjunction with the accompanying drawings, in which:

DETAILED DESCRIPTION OF THE PREFERRED EMBODIMENTS

Figure 1:
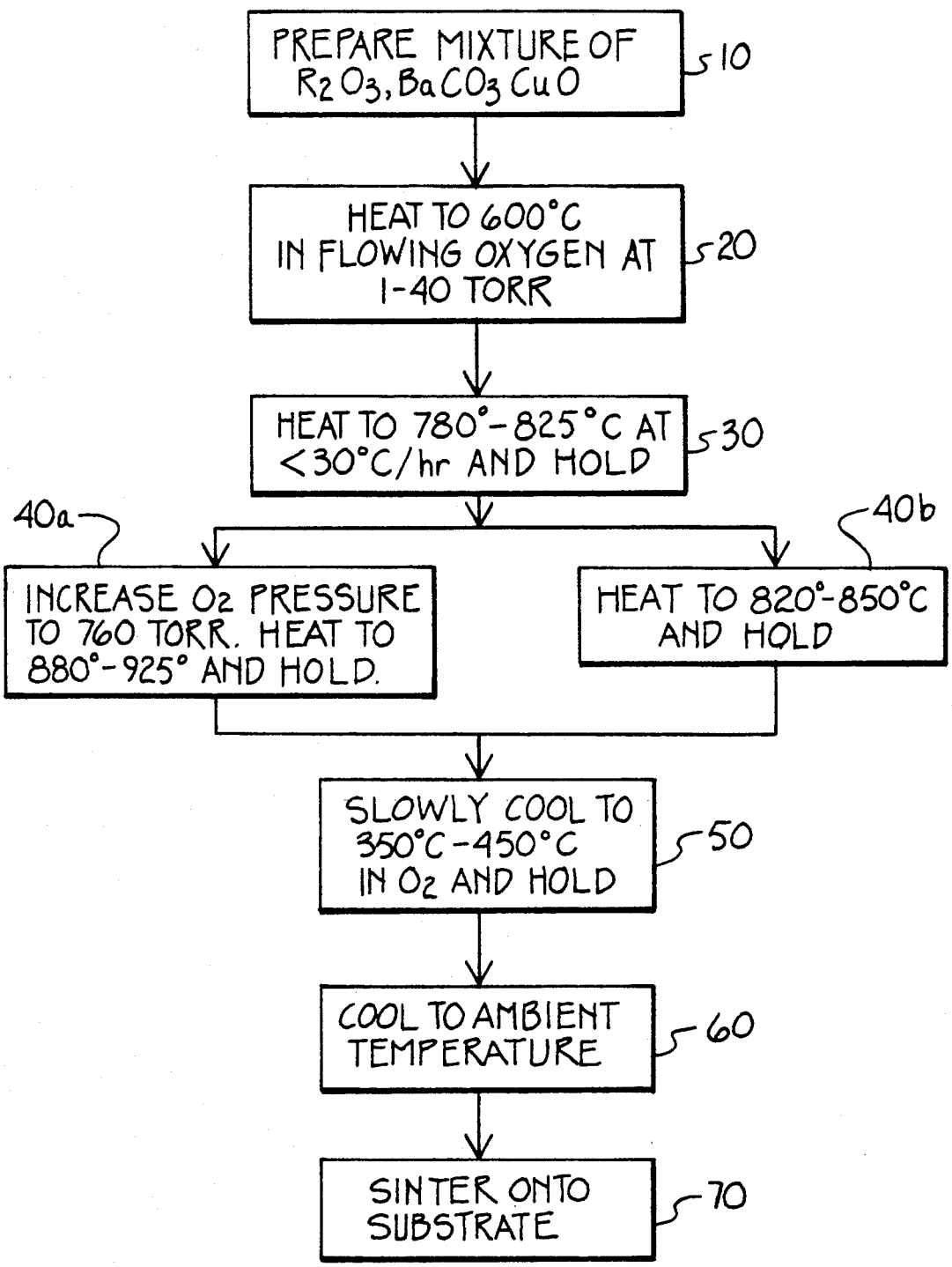
FIG. 1 is a flowsheet of the process of the present invention.

The present invention is described with reference to terms defined as follows:

"Melting onset temperature" is the peritectic decomposition temperature. It physically represents the temperature at which a given composition in a solid state first evidences transition to a different composition in a liquid and a solid state. On a differential thermal analysis (DTA) curve of a single homogeneous composition, the melting onset temperature is observed as the point where the initial slope substantially changes. The melting onset temperature is generally designated as point A in the drawings.

"Melting transition" is a temperature range bounded at the bottom end by the melting onset temperature and bounded at the top end by the temperature at which there is no further evidence of transition of the starting composition, i.e., melting transition endpoint. The melting transition endpoint is generally designated as point C in the drawings and the melting transition is the temperature range between points A and C.

"Melting transition width" is the difference between the melting transition midpoint and the melting onset temperature, wherein the melting transition midpoint is the endotherm represented by the inflection point at the minimum of the melting transition on the DTA curve. The melting transition midpoint is generally designated in the drawings as point B and the melting transition width is the temperature range between points A and B. The melting transition midpoint may or may not be the numerical midpoint of the melting transition.

The melting transition midpoint is a substantially fixed physical parameter for any given composition, whereas the melting transition width, and consequently the melting onset temperature of the composition, may vary, for example, as a function of the conditions under which the composition is prepared. Accordingly, the present invention is a method for producing a superconductor powder under conditions which preferably increase the melting onset temperature, and consequently reduce the melting transition width, relative to powders produced by conventional processes. The resulting powder of the present invention is subsequently sintered onto a substrate to form a superconductor-coated substrate.

Referring now to block 10 in the flowsheet of FIG. 1, the process of the present invention is initiated by preparing a mixture of starting materials comprising powders of $R_2O_3$, $BaCO_3$, and $CuO$, where R is used to designate yttrium or a rare earth element. A rare earth element is defined as an element having an atomic number between 57 and 71 inclusive.

The starting materials of the mixture, should be substantially free of atmospheric reaction products. The light rare earth oxides, La through Gd, and particularly the oxides of La and Nd, are very reactive with atmospheric water vapor, causing the oxide to convert to hydroxide. Therefore, it is preferable to prebake light rare earth oxides at a temperature between 950° C. and 1000° C. for 12 hours in flowing oxygen to convert any hydroxides to oxides before using the light rare oxides as starting materials in the present invention. The prebaked light rare earth oxides are then preferably maintained in a water vapor-free environment thereafter.

The starting materials are combined in proportions such that the stoichiometric ratio of R-Ba-Cu in the product powder is on the order of about 1-2-3. When utilizing certain light rare earth elements, the ratio of R-Ba-Cu in the product powder may not be exactly 1-2-3, but will nevertheless approximate 1-2-3. For example, it has been found that a single phase superconductor powder can be prepared according to the present invention using Nd having a stoichiometry of $Nd_{1.05}Ba_{1.95}Cu_3O_{7-x}$, where x is preferably from $-0.5$ to 1, rather than a stoichiometry of exactly $Nd_1Ba_2Cu_3O_{7-x}$. Although such powders do not have a R-Ba-Cu ratio of exactly 1-2-3, they are nevertheless within the definition of "1-2-3" materials as the term is used herein. The present invention can also be used to form a superconducting material having a formula $La_{1.25}Ba_{1.75}Cu_3O_{7-x}$ wherein x is between $-0.5$ and 1.

The powdered starting materials are intimately mixed and finely divided to a desired particle size using substantially any conventional milling method. For example, the powders can be placed in a high-density polyethylene jar with zirconia grinding media and isopropanol and milled. The wet milled powder is dried in an oven and then screened. The desired final particle size of the finely divided powder is between about 0.5 and 10 microns and preferably between about 1 and 3 microns.

The preferred lower size limit of about 1 micron is selected because, if the particle size of the milled powder is significantly smaller, the $CO_2$ decomposition product of $BaCO_3$ may undesirably become trapped in the interstitial spaces of the powder bed during calcining. The preferred upper size limit of about 3 microns is selected because, if the particle size of the milled powder is significantly larger, the adjacent particles of $R_2O_3$, $BaCO_3$ and $CuO$ will not react and interdiffuse sufficiently to form the desired homogeneous single-phase powder during calcining.

After milling, the powdered mixture is placed in a calcining vessel to undergo an initial or first heating stage. Block 20 shows the conditions for the initial heating stage. The mixture is maintained under flowing oxygen at an oxygen partial pressure between about 1 and 40 torr, preferably between about 1 and 3 torr, and more preferably at about 2 torr. Active pumping aids in the removal of carbon dioxide evolving from the heated mixture. The low oxygen pressure also enhances the desired decomposition of the barium carbonate.

The mixture is heated during the first heating stage up to a maximum temperature between about 500° C. and 700 ° C., preferably between about 550° C. and 650 ° C., and more preferably about 600° C. The heating rate during the first stage can be relatively rapid, i.e., greater than about 30° C. per hour, if desired, without substantially damaging the ultimate product.

The conditions for the second heating stage are shown in block 30. The atmosphere of the calcining Vessel is maintained at substantially the same level as the initial heating stage throughout the entire second heating stage. However, the temperature of the mixture is raised substantially in the second heating stage at a controlled heating rate up to a predetermined plateau temperature.

A plateau temperature is selected for the second heating stage which is below the lowest temperature eutectic that occurs in the $R_2O_3$-BaO-CuO mixture at the pressure conditions of the vessel. Thus, the mixture is heated in the second heating stage from the maximum temperature of the initial heating stage up to the plateau temperature which is selected between about 780° C. and 825° C., preferably between about 790° C. and 815° C., and more preferably about 800° C.

The controlled heating rate in the second stage should not exceed about 30° C. per hour. When the mixture is heated above the maximum temperature of the first stage, faster heating rates above about 30° C. per hour tend to produce unacceptably high concentrations of carbon dioxide in the calcining vessel which cause the undesired formation of impurity phases. Thus, the preferred heating rate in the second stage is between about 10° C. and 30° C. and more preferably about 20° C. per hour.

Once the plateau temperature is reached, it is maintained for about 0.5 to 15 hours, preferably for about 1 to 10 hours, and more preferably for about 4 hours to produce a calcined superconductor powder which is substantially a homogeneous single-phase composition containing substantially no liquids capable of causing phase segregation and inhomogeneities. Nevertheless, differential thermal analysis of the powder shows it to have a broad melting transition and an unacceptably low melting onset temperature. Therefore, a third heating stage is required to narrow the melting transition.

Block 40a characterizes a first embodiment of the third heating stage. The atmosphere of the calcining vessel is modified by increasing the oxygen partial pressure over that of the first two heating stages and, preferably to between about 200 and 800 torr, and more preferably to about 760 torr. The temperature of the calcining vessel is also increased by heating the powder therein to a temperature between about 880° C. and 925° C., preferably between about 890° C. and 910° C., and more preferably to about 900° C. The temperature of the third stage is maintained for about 0.5 to 15 hours, preferably for about 1 to 10 hours, and more preferably for about 4 hours.

Block 40b characterizes an alternative embodiment of the third heating stage. According to this embodiment, the atmosphere of the calcining vessel is maintained at substantially the same level as the first two heating stages, but the powder is heated to a temperature between about 820° C. and 850° C., preferably between about 820° C. and 840° C., and more preferably about 825° C. This temperature is maintained for about 0.5 to 15 hours, preferably for about 1 to 10 hours, and more preferably for about 4 hours. Either embodiment of the third heating stage effectively reduces the melting transition width by increasing the melting onset temperature. Thus, it is apparent that the operations represented by blocks 40a and 40b are to be performed in the alternative.

Additional heating stages could be performed at higher temperatures than those of the third stage to further increase the melting onset temperature. However, the melting onset temperature is increased only slightly by additional incremental heating stages. This benefit is insufficient to offset the undesirable increase in the degree of agglomeration and particle size of the calcined grains caused by additional heating stages. The resulting grains would require an extensive milling operation for deglomeration and particle size reduction. Thus, additional heating stages beyond the third stage are generally not favored.

As is apparent, the present preferred three-stage heat treatment strives to optimize the advantages of lower heating stage temperatures and the advantages of higher heating stage temperatures. Lower heating stage temperatures favor a product which is a fine weakly-agglomerated calcined powder relatively free of impurity phases. Higher heating stage temperatures favor a product having a relatively high melting onset temperature.

Upon completion of the heating stages, a first cooling stage is performed as indicated in block 50. In the first cooling stage, the product is slowly cooled in an oxygen atmosphere for about 0.5 to 20 hours, preferably for about 1 to 10 hours and more preferably for about 4 hours. The product is cooled to a temperature between about 325° C. and 450° C., preferably between about 350° C. and 425° C., and more preferably about 400° C. The cooling stage promotes oxygenation of the mixture. If desired, the product may be maintained at the final temperature of the first cooling stage for about 1 to 12 hours, and preferably for about 2 to 8 additional hours to ensure complete oxygenation.

The first cooling stage may be conducted at the oxygen partial pressure utilized in either embodiment of the third heating stage shown in blocks 40a and 40b respectively. However, if the higher oxygen partial pressure of the first embodiment is utilized in the first cooling stage, the presence of $CO_2$ as an impurity in the oxygen atmosphere, typically in a range of 5 to 25 ppm, will result in a carbon content in the final product between about 300 and 1300 ppm. In contrast, if the lower oxygen pressure of the alternative embodiment is utilized in the first cooling stage, the carbon content of the final product will be between about 100 and 300 ppm. Since a product having a low carbon content is desirable to produce superconductors having a high critical current density, cooling at the lower oxygen pressure is preferred.

The second cooling stage is indicated in block 60. In this stage the product is cooled to ambient room temperature in the presence of oxygen. The resulting product is a substantially single phase 1-2-3 superconductor powder having the basic formula $R_1Ba_2Cu_3O_{7-x}$, where R is yttrium or a rare earth metal and x is between 1 and $-1$, preferably between 1 and $-0.5$, and most preferably between 0.3 and $-0.2$. The product powder has a melting transition width less than about 50° C. and preferably less than about 30° C. The melting onset temperature is a function of the specific identity of R.

Although the present invention is preferably used to produce a high purity 1-2-3 superconductor powder, in some limited cases it may be desireable within the scope of the present invention to produce a 1-2-3 superconductor powder by the method disclosed herein which is a first phase in a mixture also having a controlled amount of a second phase material. For example, the 1-2-3 superconductor powder could be produced in a mixture as a first phase with $R_2BaCuO_5$ as the second phase, wherein the $R_1Ba_2Cu_3O_{7-x}:R_2BaCuO_5$ ratio in the mixture is 0.8:0.2. The presence of $R_2BaCuO_5$ particles dispersed within the $R_1Ba_2Cu_3O_{7-x}$ powder provides flux-pinning benefits.

In any case the final product powder has direct utility as a superconductor. However, the powder may be further processed to enhance its utility for a specific desired application. For example, block 70 indicates that after cooling, the powder may be sintered onto a metallic substrate. The exact sintering temperature utilized will depend on the identity of the R element and the melting onset temperature of the powdered product. As a rule, however, the powder is preferably sintered at as high a temperature as possible which approaches the melting onset temperature of the powder without substantially melting the powder. The powder is most preferably sintered at a temperature which is from 50° C. to 5° C. less than the melting onset temperature of the powder. Thus, for example, a powder wherein R is dysprosium, which is prepared in the manner of the present invention, typically has a melting onset temperature between about 1030° C. and 1045° C. and is preferably sintered onto a substrate for between about 0.5 and 5 minutes at a temperature between about 1000° C. and 1020° C.

Figure 2:
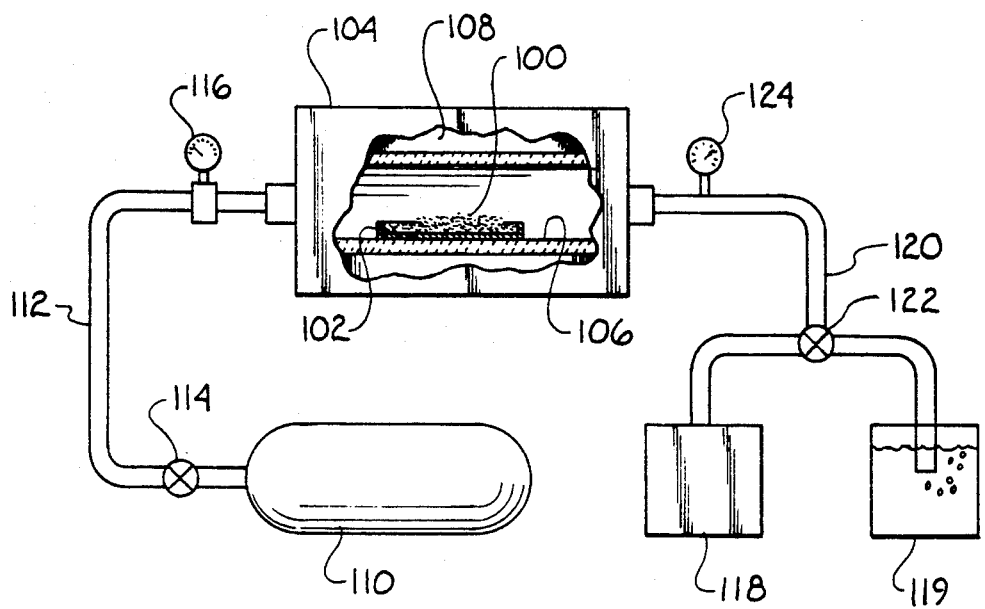
FIG. 2 is a schematic of an equipment arrangement for calcining the starting material mixture according to the process of the present invention.

An arrangement of calcining equipment used in accordance with the process steps of blocks 20, 30, 40a, 40b, 50, and 60 of FIG. 1 is shown schematically in FIG. 2. A mixture of milled starting materials 100 is supported in a high purity alumina tray 102 Which is positioned within a calcining vessel 104. Calcining vessel 104, shown in a Cut-away cross section, comprises a quartz tube 106 surrounded by a furnace 108 for heating mixture 100. An oxygen reservoir 110 is in fluid communication with quartz tube 106 via Oxygen line 112 entering one end of quartz tube 106. An oxygen shut-off valve 114 and flowmeter 116 are provided OD line 112.

A vacuum pump 118 and an open purge vessel 119 are in selective fluid communication with quartz tube 106 via line 120 entering the opposite end of quartz tube 106 from oxygen line 112. A multi-directional valve 122 and a pressure gauge 124 are provided On line 120.

By opening valve 114 and valve 122 to vacuum pump 118, a flow of oxygen can be drawn under subatmospheric pressure across the mixture 100. Alternatively, by opening valve 114 and valve 122 to purge vessel 119, a flow of oxygen can be drawn at atmospheric pressure across the mixture 100. The oxygen exiting line 120 is bubbled through a liquid, such as oil, in purge vessel 119 out to the atmosphere. In other configurations valves 114 and 122 can both be closed to isolate reservoir 110, pump 118 and vessel 119 from quartz tube 106. Valves 114 and 122 can also be positioned to open both ends of quartz tube 106 to the ambient atmosphere.

The following examples provide further details of preferred embodiments of the present invention. Parts and percentages are by weight, unless otherwise indicated.

EXAMPLE I

Raw powders in the following amounts are weighed out, 50.4 g $Dy_2O_3$, 106.7 g $BaCO_3$, and 64.5 g CuO. The powders are placed in a 500 ml zirconia grinding jar along with 250 ml of isopropanol and 400 g of zirconia grinding balls having a diameter of 5 mm. The jar is placed in a Brinkman PM-4 planetary ball mill and milled at speed 8 for 26 hours.

The resulting powder is dried at 135° C. to evaporate the isopropanol and sieved through a 30 mesh sieve to separate the powder from the balls. The powder is then placed in a high purity alumina tray and inserted into a furnace. The powder is rapidly heated to 600° C. under an oxygen pressure of 2 torr. Upon reaching 600° C., the powder is heated at 30° C. per hour to 800° C. and maintained thereat for 4 hours. The pump maintaining the low oxygen pressure is then valved off and the oxygen pressure is increased to 1 atmosphere. The furnace temperature is increased to 900° C. and maintained there for 4 hours. The furnace is then cooled to 400° C. and maintained there for 6 hours.

Figure 3:
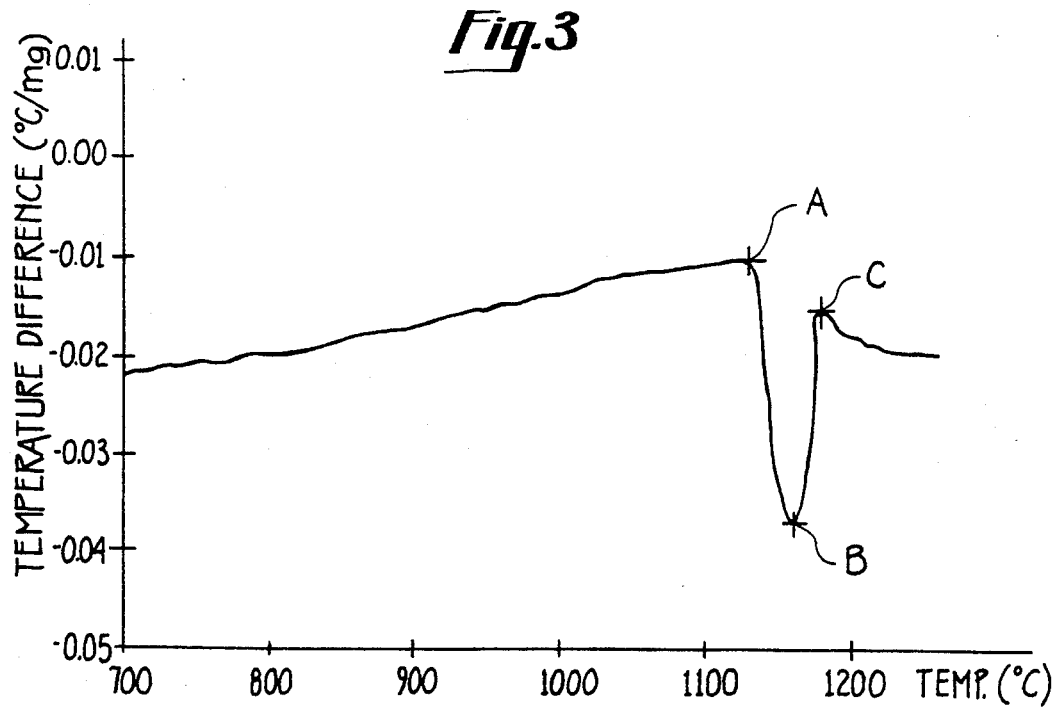
FIG. 3 is a differential thermal analysis (DTA) scan showing the melting transition for the $DyBa_2Cu_3O_{7-x}$ of Example 1.

A differential thermal analysis (DTA) scan of the product performed in flowing $O_2$ at a heating rate of 10° C. per minute shows no evidence of second phase-induced eutectics. The DTA of FIG. 3 further shows a melting onset temperature for the $DyBa_2Cu_3O_{7-x}$ designated by point A of 1033° C., a melting transition endotherm midpoint designated by point B of 1061° C., and a melting transition endpoint designated by point C of 1079° C. The melting transition width for the $DyBa_2Cu_3O_{7-x}$, which is the temperature range between points A and B, is 28° C.

EXAMPLE II

Raw powders in the following amounts are weighed out, 41.6 g $Nd_2O_3$, 90.6 g $BaCO_3$ and 56.2 g CuO. The $Nd_2O_3$ has been prebaked at 950° C. for 8 hours in flowing oxygen and stored in a dry box. The proportions of raw powders correspond to a final product stoichiometry of $Nd_{1.05}Ba_{1.95}Cu_3O_{7-x}$.

The powders are placed in a 500 ml zirconia grinding jar along with 250 ml of isopropanol and 400 g of zirconia grinding balls having a diameter of 5 mm. The jar is placed in a Brinkman PM-4 planetary ball mill and milled at speed 8 for 12 hours.

Figure 4:
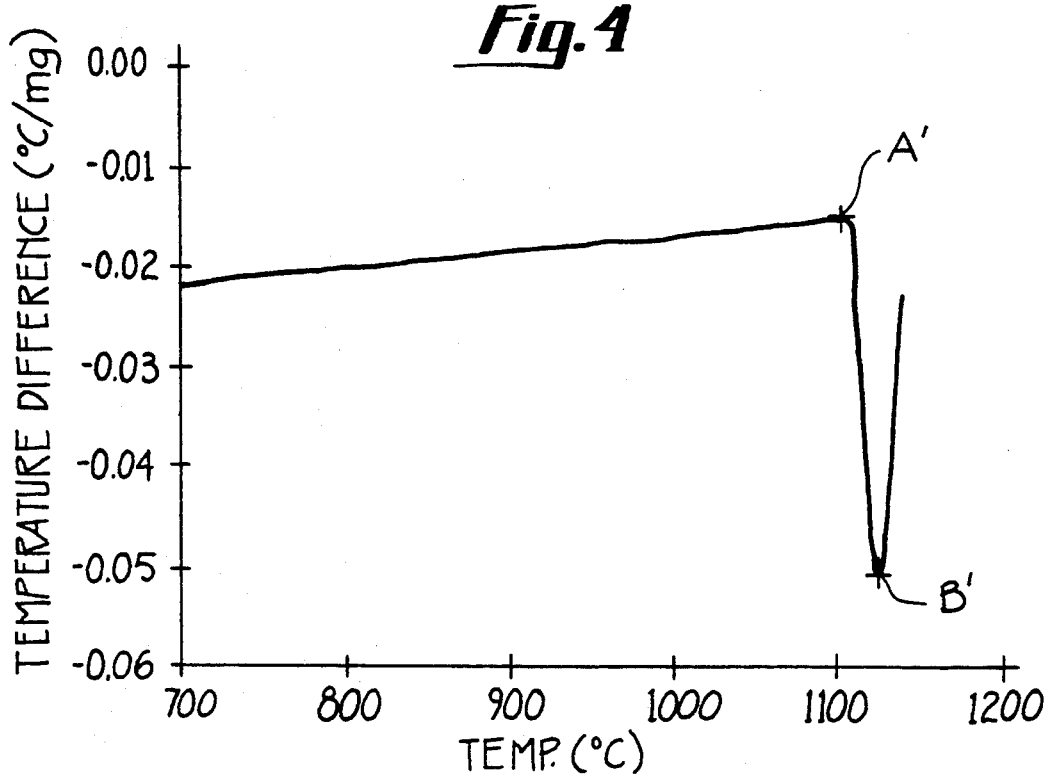
FIG. 4 is a differential thermal analysis (DTA) scan showing the melting transition for the $Nd_{1.05}Ba_{1.95}Cu_3O_{7-x}$ of Example 2.

The resulting powder is dried at 135° C. to evaporate the isopropanol and sieved through a 30 mesh sieve to separate the powder from the balls. The powder is then placed in a high purity alumina tray and inserted into a furnace. The powder is rapidly heated to 600° C. under an oxygen pressure of 2 torr. Upon reaching 600° C., the powder is heated at 12° C. per hour to 825° C. and maintained thereat for 4 hours. The pump maintaining the low oxygen pressure is then valved off and the oxygen pressure is increased to 1 atmosphere. The furnace temperature is increased to 915° C. and maintained there for 4 hours. The furnace is then cooled to 400° C. and maintained there for 6 hours. 5 A DTA scan of the product performed in flowing $O_2$ at a heating rate of 10° C. per minute shows no evidence of second phase-induced eutectics. The DTA of FIG. 4 further shows a melting onset temperature for the $Nd_{1.05}Ba_{1.95}Cu_3O_{7-x}$ designated by point A of 1105° C. and a melting transition endotherm midpoint designated by point B of 1124° C. The melting transition width for the $Nd_{1.05}Ba_{1.95}Cu_3O_{7-x}$, which is the temperature range between A' and B', is 19° C.

EXAMPLE III

Raw powders in the following amounts are weighed out, 231.9 g $Dy_2O_3$, 490.7 g $BaCO_3$, and 296.7 g CuO. The powders are placed in a 2 liter high-density polyethylene jar along with 800 ml of isopropanol, 1.6 kg of zirconia grinding balls having a diameter of 5 mm, and 1.1 kg of zirconia grinding balls having a diameter of 10 mm. The jar is placed on a standard rolling mill and milled for 26 hours.

The resulting powder is dried at 140° C. to evaporate the isopropanol and sieved through a 30 mesh sieve. The powder is then placed in high purity alumina trays and inserted into a furnace. The powder is initially heated at 600° C. per hour to 600° C., and then heated at 20° C. per hour to 800° C., where it is maintained for 4 hours. The powder is then heated at 20° C. per hour to 825° C., where it is maintained for 4 hours. The furnace is then cooled to 350° C. and maintained there for 7 hours. All of the heating and cooling stages in the furnace are performed under 2 torr of flowing oxygen.

Figure 5:
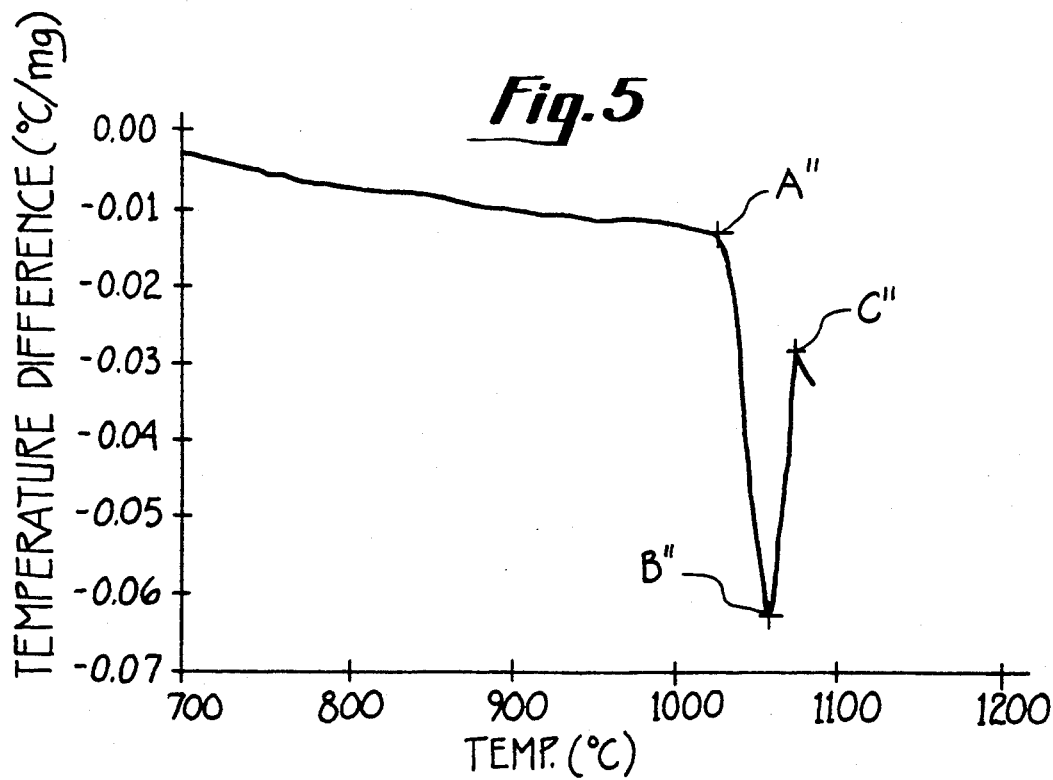
FIG. 5 is a differential thermal analysis (DTA) scan showing the melting transition for the $DyBa_2Cu_3O_{7-x}$ of Example 3.

A DTA scan of the product performed in flowing $O_2$ at a heating rate of 10° C. per minute shows no evidence of second phase-induced eutectics. The DTA of FIG. 5 further shows a melting onset temperature for the $DyBa_2Cu_3O_{7-x}$ designated by point A'' of 1033° C., a melting transition endotherm midpoint designated by point B'' of 1058° C., and a melting transition endpoint designated by C'' of 1075° C. The melting transition width for the $DyBa_2Cu_3O_{7-x}$, which is the temperature range between A'' and B'', is 25° C.

While certain preferred conditions, quantities and other parameters were detailed in the above description of preferred embodiments, those can be varied, where suitable, with similar results. Various applications, variations and ramifications of this invention will occur to those skilled in the art upon reading the present disclosure. Those are intended to be included within the scope of this invention as defined in the appended claims.

We claim:

1. A process for producing a superconductor powder comprising:
   (a) providing a mixture of finely divided $R_2O_3$, $BaCO_3$ and CuO in stoichiometric proportions wherein the ratio of R-Ba-Cu in said mixture is about 1-2-3 and R is selected from the group consisting of yttrium, elements having an atomic number between 57 and 71 inclusive, and mixtures thereof;
   (b) heating said mixture to a preheat temperature in oxygen at an initial oxygen partial pressure between about 1 and 40 torr;
   (c) heating said mixture from said preheat temperature to a plateau temperature greater than said preheat temperature at a heating rate less than about 30° C. per hour and at said initial oxygen partial pressure, said plateau temperature between about 780° C. and 825° C.;
   (d) maintaining said mixture at said plateau temperature and said initial oxygen partial pressure for a time sufficient to calcine said mixture to a superconductor powder having a formula $R_1Ba_2Cu_3O_{7-x}$ wherein x is between about $-1$ and 1;
   (e) increasing oxygen partial pressure to between about 200 and about 800 torr above said initial oxygen partial pressure;
   (f) heating said superconductor powder to an increased temperature between about 880° C. and 925° C. at said increased oxygen partial pressure; and
   (g) maintaining said superconductor powder at said increased temperature and said increased oxygen partial pressure for a time sufficient to reduce the melting transition width of said superconductor powder.

2. The process as recited in claim 1 further comprising cooling said superconductor powder under oxygen to a cooled temperature between about 325° C. and 450° C.

3. The process as recited in claim wherein said preheat temperature is between about 500° C. and 700° C.

4. The process as recited in claim 1 wherein said increased oxygen pressure is about 760 torr.

5. The process as recited in claim 1 wherein the melting transition width of said superconductor powder is than about 30° C. decreased to less 6. The process as recited in claim wherein said initial and increased oxygen partial pressures are maintained by flowing oxygen gas across said mixture and said superconductor powder respectively.

7. The process as recited in claim 1 wherein said plateau temperature is maintained for between about 0.5 and 15 hours.

8. The process as recited in claim 1 wherein said increased temperature is maintained for between about 0.5 and 15 hours.

9. The process as recited in claim 1 wherein said mixture has a particle size between about 1 and 3 microns.

10. The process as recited in claim 1 wherein said superconductor powder is $Nd_{1.05}Ba_{1.95}Cu_3O_{7-x}$ and further wherein x is between about −0.5 and 1.

11. A process for producing a superconductor powder comprising:
(a) providing a mixture of finely divided $La_2O_3$, $BaCO_3$ and CuO in stoichiometric proportions wherein the ratio of La-Ba-Cu in said mixture is about 1.25:1.75:3;
(b) heating said mixture to a preheat temperature in oxygen at an initial oxygen partial pressure between about 1 to 40 torr;
(c) heating said mixture from said preheat temperature to a plateau temperature greater than said preheat temperature at a heating rate less than about 30° C. per hour and at said initial oxygen pressure, said plateau temperature between about 780° C. and 825° C.;
(d) maintaining said mixture at said plateau temperature and said initial oxygen partial pressure for a time sufficient to calcine said mixture to a superconductor powder having a formula $La_{1.25}Ba_{1.75}Cu_3O_{7-x}$ wherein x is between −0.5 and 1;
(e) increasing oxygen partial pressure above said initial oxygen partial pressure to between about 200 and about 800 torr;
(f) heating said superconductor powder to an increased temperature between about 880° C. and 925° C. at said increased oxygen partial pressure; and
(g) maintaining said superconductor powder at said increased temperature and said increased oxygen partial pressure for a time sufficient to reduce the melting transition width of said superconductor powder.

* * * * *